United States Patent
Schoolcraft

(10) Patent No.: US 9,476,487 B2
(45) Date of Patent: Oct. 25, 2016

(54) NESTED ENDLOAD ASSEMBLY FOR A VARIATOR

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 733 days.

(21) Appl. No.: 13/869,611

(22) Filed: Apr. 24, 2013

(65) Prior Publication Data
US 2013/0288849 A1    Oct. 31, 2013

Related U.S. Application Data

(60) Provisional application No. 61/638,093, filed on Apr. 25, 2012.

(51) Int. Cl.
*F16H 15/38* (2006.01)

(52) U.S. Cl.
CPC .......... *F16H 15/38* (2013.01); *F16H 2015/383* (2013.01)

(58) Field of Classification Search
CPC .......................... F16H 15/38; F16H 2015/383
USPC ........................................ 476/10, 40, 41, 48
See application file for complete search history.

(56) References Cited

U.S. PATENT DOCUMENTS

| 6,162,144 A * | 12/2000 | Haka ..................... F16H 61/664 475/216 |
| 6,740,001 B1 * | 5/2004 | Ishikawa ................. F16H 15/38 476/41 |
| 8,038,564 B2 | 10/2011 | Earhart et al. |
| 2011/0152031 A1 | 6/2011 | Schoolcraft |

FOREIGN PATENT DOCUMENTS

| CN | 1221479 A | 6/1999 |
| CN | 1226954 A | 8/1999 |
| DE | 10 2005 018 496 | * 11/2006 |

(Continued)

OTHER PUBLICATIONS

International Preliminary Report on Patentability for International Application No. PCT/US2013/038013, issued Oct. 28, 2014, 6 pages.
Examiner's First Report for Australian Application No. 2013251662, issued May 30, 2016, 4 pages.

(Continued)

*Primary Examiner* — William C Joyce
(74) *Attorney, Agent, or Firm* — Barnes & Thornburg LLP

(57) ABSTRACT

A transmission includes a toroidal variator including a nested endload assembly. The nested endload assembly has two chambers configured to develop a clamping force on components of the variator. The endload assembly includes a housing, a backing plate, a piston positioned adjacent the backing plate and cooperating with the backing plate to define a first chamber for receiving pressurized fluid to act on the piston. The endload assembly also includes a load plate and an input race that cooperate to define a second chamber. The input race of the variator is acted upon by the piston when the piston is acted upon by pressurized fluid in the first chamber. The input race is also acted upon by pressurized fluid in the second chamber.

18 Claims, 4 Drawing Sheets

(56) References Cited

FOREIGN PATENT DOCUMENTS

| | | | |
|---|---|---|---|
| DE | 102005018496 A1 | | 11/2006 |
| JP | 2006-144880 | * | 6/2006 |
| JP | 2006-144880 A | | 6/2006 |
| WO | 9740292 A | | 10/1997 |
| WO | 2005015061 | | 2/2005 |

OTHER PUBLICATIONS

Search Report and Written Opinion from the State Intellectual Property Office for the People's Republic of China for Application No. 201380027352.X, dated Jun. 3, 2016, 24 pages.
Search Report and Written Opinion from the European Patent Office for Application No. 13781849.8, dated Aug. 9, 2016, 12 pages.

* cited by examiner

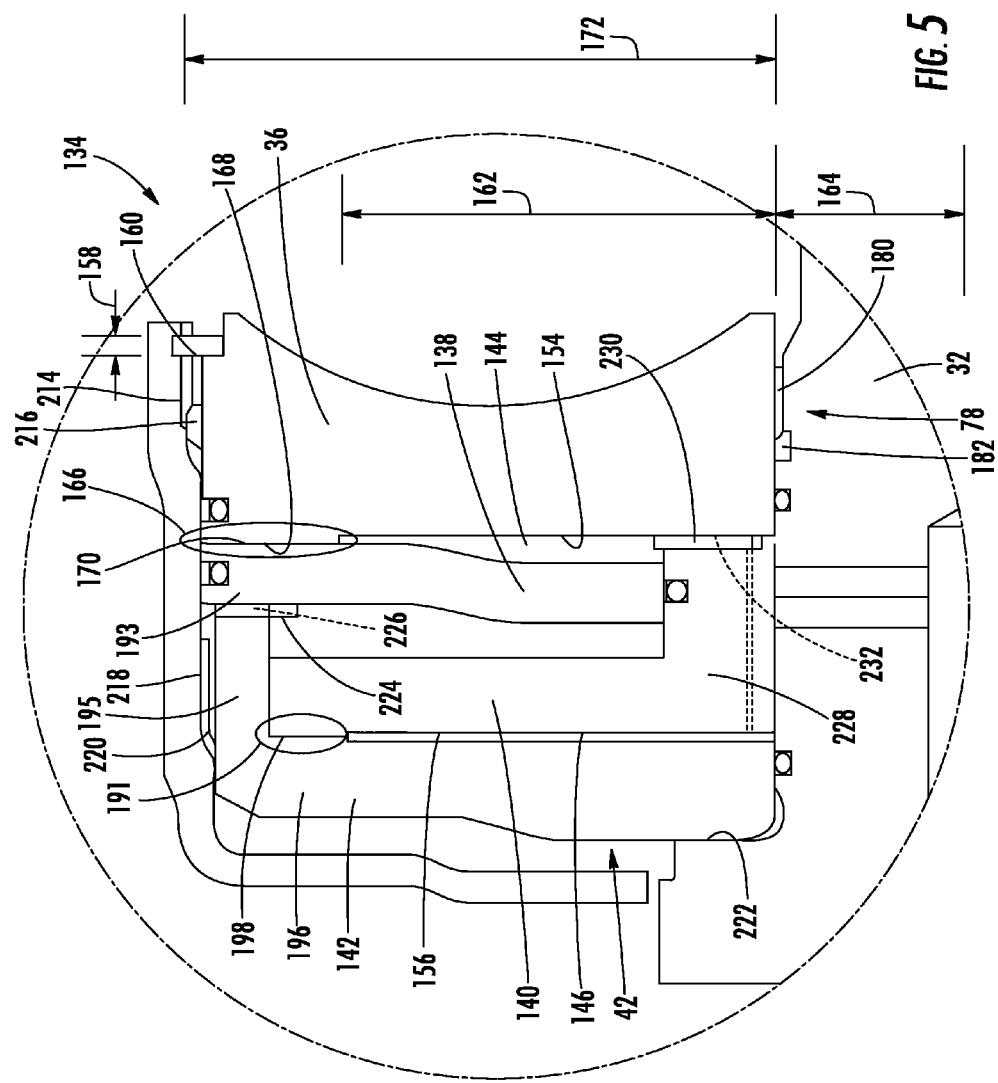

NESTED ENDLOAD ASSEMBLY FOR A VARIATOR

CROSS-REFERENCE TO RELATED U.S. PATENT APPLICATION

This application claims priority to, and the benefit of, U.S. Provisional Patent Application Ser. No. 61/638,093 entitled "NESTED ENDLOAD ASSEMBLY FOR A VARIATOR" by Brian Schoolcraft, which was filed on Apr. 25, 2012, the entirety of which is incorporated herein by reference.

TECHNICAL FIELD

The present disclosure relates generally to a toroidal race rolling-traction type transmission. More specifically, the present disclosure relates to an improved arrangement for hydraulically applying an endload to a toroidal race rolling-traction type transmission.

BACKGROUND

In a continuously variable transmission, a ratio-varying unit ("variator") is used to provide a continuous variation of transmission ratio. Variators, and specifically toroidal variators, are used to provide a continuously variable transfer rotation from an input to an output. A full toroidal variator includes two output races each having a partial toroidal cross-sectional profile. The races are configured with their toroidal profiles exposed oppositely with a rotational output secured between the two races so that the two races and rotational output rotate together about a common axis. The two output races cooperate to define a toroidal output that is normally supported on a rotating shaft, with the toroidal output supported on the shaft by roller bearings that permit the toroidal output to rotate relative to the rotating shaft.

The full toroidal variator generally also includes a pair of input races positioned on the rotating shaft so that each input race is opposite one of the output races so that an input race and an output race cooperate to define a cross-section of a torus. The input races are keyed to the rotating shaft such that they rotate with the shaft during rotation of the shaft. A full toroidal variator typically has a number of rollers that are positioned between the respective sets of input races and output races, the rollers transferring rotation of the input races to the output races. The rollers are pivotably supported in a manner that allows their orientation to be altered to change the ratio of input to output through the variator.

Generally, there is no direct contact between the rollers and the races and the motion transferred therebetween is accomplished by transferring friction between a race and a roller through a generally incompressible fluid medium that is subjected to shear during rotation of the input races. The shear applied to the fluid medium acts on the roller surface proximate the input races, causing the rollers to rotate about their axis. The rotation of the roller is transferred to the output races in a similar manner with rollers applying shear to the fluid medium that causes motion to be transferred to the output races. Such an arrangement eliminates the need for direct contact between the rollers and races, thereby reducing the opportunity for galling of the rollers and races and providing for longer life of the variator.

Because the variator is used to transfer torque as well as motion, it is important to maintain the fluid medium at sufficient pressure to cause the motion to be transferred between the races and rollers with minimal slip. Pressure between the rollers and races is applied through an endload arrangement that operates to increase the pressure in the variator when increased torque conditions occur. The load is applied to one of the input races in an axial direction that varies a clamping force between the input races and the output races.

SUMMARY

The present application discloses one or more of the features recited in the appended claims and/or the following features which alone or in any combination, may comprise patentable subject matter.

According to a first aspect of the present disclosure, a continuously variable transmission includes a rotational input, a shaft coupled to the rotational input, and a variator. The variator includes a nested endload assembly. The nested endload assembly includes two chambers configured to develop a clamping force on components of the variator.

In some embodiments, the nested endload assembly includes a housing, a backing plate axially engaged with the housing, and a piston. The axial engagement of the backing plate to the housing may constrain the backing plate from rotation relative to the housing. The piston may be positioned adjacent the backing plate. The piston may cooperate with the backing plate to define a first chamber for receiving pressurized fluid to act on the piston. The endload assembly may include a load plate engaged with the backing plate. The endload assembly may further include an input race engaged with the piston. The input race may be acted upon by the piston when the piston is acted upon by pressurized fluid in the first chamber. The input race may cooperate with the load plate to define a second chamber for receiving pressurized fluid. Pressurized fluid in the second chamber may act on the input race.

In some embodiments, the continuously variable transmission further includes a countershaft assembly, the countershaft assembly coupled to the rotational input.

In some embodiments, the continuously variable transmission further includes at least one clutch operable to change a load path through the countershaft assembly.

In some embodiments, the continuously variable transmission further includes an electro-hydraulic control, the electro-hydraulic control operable to control the flow of pressurized fluid to the chambers.

In some embodiments, the load of the piston does not act on the load plate.

In some embodiments, the load plate is constrained from rotation relative to the housing.

In some embodiments, the variator includes a shaft. A portion of the first chamber may include a surface area that is spaced apart from the shaft a first distance and the second chamber may include a surface area that is spaced apart from the shaft by the first distance.

In some embodiments, the load developed by the first chamber acts on the input race over a first area. In some embodiments, the load developed by the second chamber acts on the input race over a second area, the second area different from the first area.

In some embodiments, the second area is closer to the shaft than the first area.

In some embodiments, both the piston and the load plate are in direct contact with at least a portion of the backing plate.

In some embodiments, the backing plate is constrained from movement relative to the shaft in at least a first direction.

In some embodiments, the backing plate is constrained from rotation relative to the housing.

The housing may have a first portion having a first diameter and formed to include at least one first spline and a second portion having a second diameter and formed to include at least one second spline. The diameter of the first portion may be smaller than the diameter of the second portion. The backing plate may include a plurality of third splines engaged with the at least one first spline such that the backing plate is constrained from rotation relative to the housing.

In some embodiments, the input race may include a plurality of fourth splines engaged with the at least one second spline such that the input race is constrained from rotation relative to the housing.

According to a second aspect of the present disclosure, an endload assembly includes a housing, a backing plate, a piston, a load plate, and an input race. The backing plate may be engaged with the housing. The piston may be positioned adjacent the backing plate. The piston may cooperate with the backing plate to define a first chamber for receiving pressurized fluid to act on the piston. The load plate may be engaged with the backing plate. The input race may be engaged with the piston. The input race may be acted upon by the piston when the piston is acted upon by pressurized fluid in the first chamber. The input race may cooperate with the load plate to define a second chamber. The second chamber may receive pressurized fluid to act on the input race.

In some embodiments, the first chamber defines a piston reaction area on which the pressurized fluid acts. In some embodiments, the piston reaction area is variable. In some embodiments, the second chamber defines an input race reaction area on which the pressurized fluid acts. In some embodiments, the second chamber defines an input race reaction area on which the pressurized fluid acts. In some embodiments, the input race reaction area is variable.

In some embodiments, the endload assembly is supported on a rotating shaft. The input race may be moveable relative to the shaft along a longitudinal axis of the shaft.

In some embodiments, the first chamber and the second chamber may be in direct fluid communication.

In some embodiments, the endload assembly further includes a fluid channel between the first chamber and the second chamber.

In some embodiments, the load plate is an annular member. In some embodiments, the load plate includes an offset that defines at least a portion of the second chamber.

In some embodiments, the piston reaction area contacts the backing plate in a first operating mode. In some embodiments, the piston reaction area is completely disengaged from the backing plate in a second operating mode.

In some embodiments, the input race reaction area contacts the load plate in the first operating mode. In some embodiments, the input race reaction area is completely disengaged from the backing plate in a second operating mode.

In some embodiments, the first operating mode is defined by a maximum fluid pressure.

In some embodiments, the second operating mode is defined by a minimum fluid pressure.

In some embodiments, the minimum pressure of the second operating mode is greater than or equal to the maximum pressure of the first operating mode.

In some embodiments, the housing, backing plate, piston, load plate, and input race are all supported on a rotating shaft.

In some embodiments, the first and second chambers are in fluid communication with a pressurized channel formed in the shaft.

In some embodiments, the backing plate may be engaged with the housing through a splined interface that constrains the backing plate from rotation relative to the housing.

In some embodiments, the load plate may be engaged with the backing plate through a splined interface that constrains the load plate from rotation relative to the backing plate.

In some embodiments, the input race may be engaged with the housing through a splined interface that constrains the input race from rotation relative to the housing.

In some embodiments, the piston may be engaged with the input race through a splined interface that constrains the piston from rotation relative to the housing.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The systems and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 is an enlarged view of a portion of the cross-section view of FIG. 4 designated by the circle identified by the numeral 5.

DETAILED DESCRIPTION OF THE DRAWINGS

Figure 1:
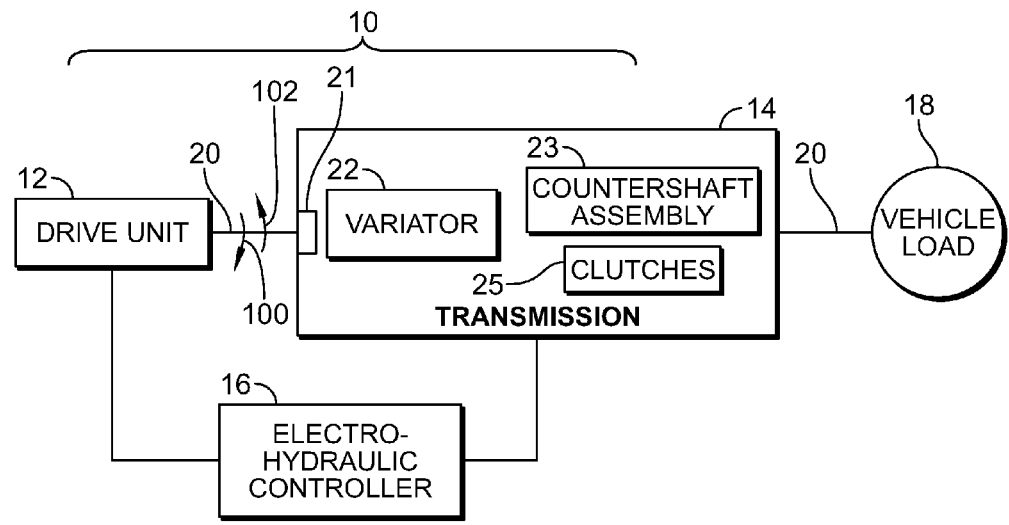
FIG. 1 is a diagrammatic representation of a vehicle including a drive train having a drive unit and a transmission and a vehicle load driven by the drive train.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Referring to FIG. 1, in one embodiment, a drive train 10 of a vehicle 8 includes a drive unit 12 and a transmission 14 configured to drive a vehicle load 18. The drive train 10 also includes an electro-hydraulic controller 16 coupled to the drive unit 12 and the transmission 14 to coordinate the operation of the drive unit 12 and the transmission 14. In some embodiments, the drive train 10 may include other components commonly found in drive trains but not illustrated in FIG. 1 in order to increase clarity of the present description.

The drive unit 12 is illustratively a diesel internal combustion engine. However, in other embodiments, the drive unit 12 may be embodied as a spark-ignition type internal combustion engine (i.e. gasoline engine), a hybrid engine-electric motor combination, or another source of rotational power. The drive unit 12 has a drive unit output shaft 20 that provides rotational power to the transmission 14.

The transmission 14 is operable to transmit the rotational power from the drive unit 12 to the vehicle load 18 at various transmission ratios. The transmission ratio provided by the transmission 14 is modified by the electro-hydraulic controller 16. The electro-hydraulic controller 16 is configured to modify the transmission ratio so that the drive unit 12 operates at an optimized set of parameters corresponding to the vehicle load 18 and the speed of the vehicle 8.

The transmission 14 illustratively includes a rotational receiver 21, a variator 22, and a countershaft assembly 23 with multiple clutches 25 operable to change the ratio of the transmission under the control of the electro-hydraulic controller 16. The rotational receiver 21 is configured to be coupled for common rotation with the drive unit output shaft 20. The transmission 14 is embodied as a continuously variable countershaft transmission unit as is known in the art. In other embodiments, the transmission 14 may be an infinitely variable transmission unit. The ratio through the transmission 14 is adjustable by engaging various modes in the countershaft assembly 23 and by varying the ratio of an input to the variator 22 to an output of the variator 22.

Figure 2:
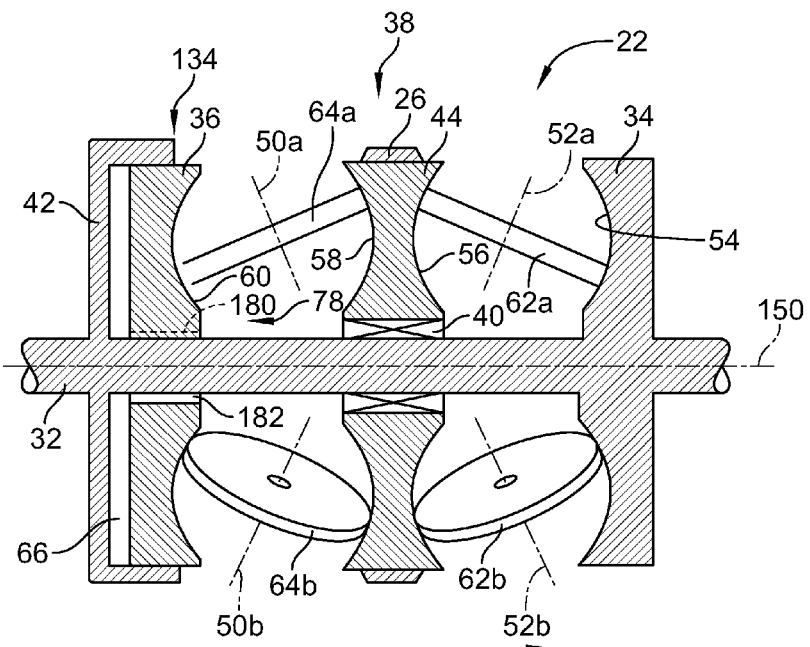
FIG. 2 is a diagrammatic representation of a variator of the transmission of FIG. 1.

As illustratively shown in FIG. 2, variator 22 includes an input shaft 32 that is selectively coupleable to the rotational receiver 21 of the transmission 14. The variator 22 includes a first input race 34 and a second input race 36, each of which is coupled to the shaft 32 to rotate with the shaft 32 about a rotation axis 150. Each of the races 34 and 36 is a disk centered on the axis 150. The input race 34 is formed to include a race surface 54 that is engaged by three rollers 62a, 62b, and 62c (not shown in FIG. 2). Similarly to input race 34, input race 36 is formed to include a race surface 60 which cooperates with three rollers 64a, 64b, and a third roller 64c (not shown in FIG. 2). As will be discussed in further detail below, the engagement between the race surfaces 54 and 60 and the respective rollers 62a, 62b, 62c, and 64a, 64b, and 64c does not require contact between the rollers 62a, 62b, 62c, and 64a, 64b, and 64c and the respective race surfaces 54 and 56.

As the shaft 32 rotates about the axis 150, the input races 34 and 36 rotate with the shaft 32 and the engagement with the rollers 62a, 62b, 62c, and 64a, 64b, and 64c transfers rotation of the races 34 and 36 to the respective rollers 62a, 62b, 62c, and 64a, 64b, and 64c. Each of the rollers 62a, 62b, 62c, and 64a, 64b, and 64c rotates about a respective axis 52a, 52b, 52c (not shown) and 50a, 50b, and 50c (not shown). As will be described in further detail below, each of the axes 52a, 52b, 52c and 50a, 50b, and 50c are pivotable to thereby change the position of the respective rollers 62a, 62b, 62c, and 64a, 64b, and 64c relative to the input races 34 and 36. It should be understood that the rotation of the rollers 62a, 62b, 62c, and 64a, 64b, and 64c is controlled such that each of the rollers 62a, 62b, 62c, and 64a, 64b, and 64c rotates at substantially the same speed as the orientation of the axes 52a, 52b, 52c, and 50a, 50b, and 50c is coordinated as described below.

The variator 22 further includes an output 38 which includes an output race 44 supported on the shaft 32 on roller bearings 40 so that the output 38 is supported on the shaft 32 but is rotatable relative to the shaft 32. Illustratively, the output 38 is formed to include a number of gear teeth 26 positioned about the periphery of the output race 44, with the gear teeth 26 configured to transfer output rotations to a complementary gear coupled to the countershaft assembly 23 of the transmission 14. It should be understood that the output 38 may take other forms and may be fixed to the shaft in other embodiments.

The variator 22 includes an endload assembly 134 that includes a housing 42. The endload assembly 134 includes a chamber 66 that is pressurized to apply a force to the input race 36 that acts on the rollers 62a, 62b, 62c, and 64a, 64b, and 64c and output race 44 to clamp the rollers 62a, 62b, 62c, and 64a, 64b, and 64c and output race 44 between the input race 36 and the input race 34. The clamp force between the input race 36 and the input race 34 is variable as will be described below. In the illustrative embodiment, the input race 34 is fixed to the shaft 32 and the input race 36 is movable to increase the clamp load.

The input race 36 forms part of the endload assembly 134 and is movable relative to the shaft 32 along axis 150 in a direction indicated by an arrow 68. The chamber 66 is pressurized with hydraulic fluid to apply a force to the input race 36 urging it in the direction of arrow 68. The input race 36 is engaged with the shaft 32 through a splined connection 78. The splined connection 78 includes the engagement of a number of splines 180 formed in the input race 36 which engage a number of splines 182 on the shaft 32. Rotation is transferred to the input race 36 from the shaft 32 through the splined connection 78, but the input race 36 is permitted to move along the shaft 32 when the chamber 66 is pressurized. It should be understood that FIG. 2 is a diagrammatic representation of the variator 22. In actual operation, the movement of the race 36 will be very slight and only of sufficient magnitude to transfer the pressure of the hydraulic fluid in chamber 66 to the rollers 62a, 62b, 62c, 64a, 64b, 64c, the output 38, and the first input race 34. The magnitude of pressure in the chamber 66 varies the clamp force applied to the variator 22 to reduce or eliminate relative movement between the rollers 62a, 62b, 62c, 64a, 64b, 64c, and the race surfaces 54, 56, 58, and 60. Those of ordinary skill in the art will recognize that a greater clamping force will tend to increase the rolling resistance between the rollers 62a, 62b, 62c, 64a, 64b, 64c, and the races surfaces 54, 56, 58, and 60. As such, it is necessary to limit the clamping force to only that which is necessary to limit relative movement between the rollers 62a, 62b, 62c, 64a, 64b, 64c, and the races surfaces 54, 56, 58, and 60. The clamping force will vary depending on the load variation between the output 38 and the shaft 32.

Figure 3:
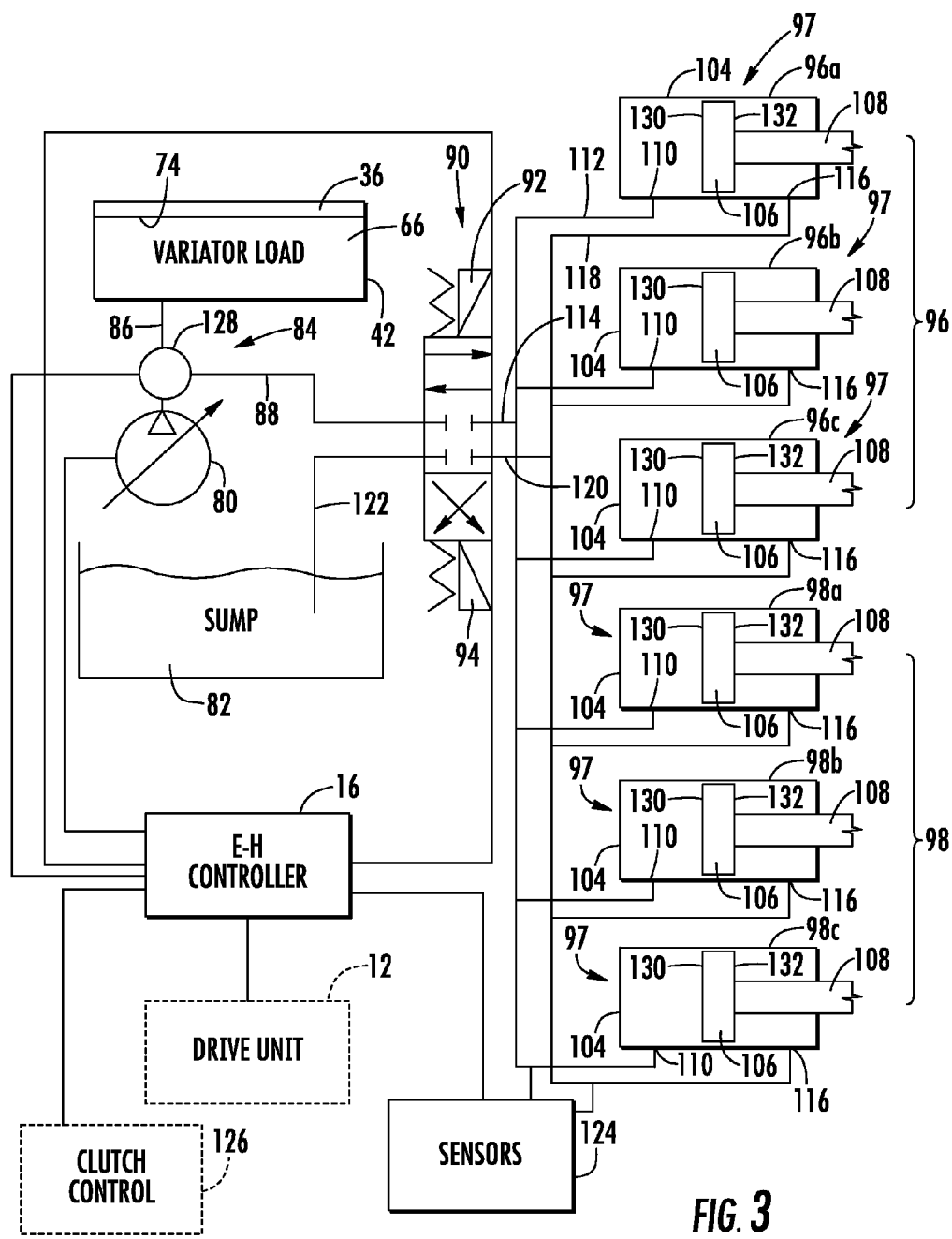
FIG. 3 is a diagrammatic representation of a portion of the hydraulic system of the transmission of FIG. 1.

Referring now to FIG. 3, the hydraulic system of the variator 22 is shown diagrammatically. The electro-hydraulic controller 16 controls a variable output pump 80 that withdraws hydraulic fluid from a sump 82, pressurizes the fluid, and supplies the fluid to a circuit 84 that includes a conduit 86 in fluid communication with the chamber 66. The circuit 84 also includes a conduit 88 that supplies a three-way valve 90 that includes two solenoids 92 and 94. The solenoids 92 and 94 are under the control of the electro-hydraulic controller 16 to control the flow of fluid through the valve 90. The valve 90 is used to operate a number of double acting cylinders 97 which control the position of the rollers 62a, 62b, 62c, 64a, 64b, 64c to control the ratio between the input races 34 and 36 and the output race 44.

A group 96 of hydraulic cylinders 97 is operable to control the position of the rollers 62a, 62b, 62c, with cylinder 96a positioning the roller 62a, cylinder 96b positioning the roller 62b, and cylinder 96c positioning the roller 62c. A group 98 of hydraulic cylinders 97 is operable to control the position of the rollers 64a, 64b, and 64c, with cylinder 98a positioning the roller 64a, cylinder 98b positioning the roller 64b, and cylinder 98c positioning the roller 64c.

Each hydraulic cylinder 97 is a double acting cylinder including a cylinder body 104, a piston 106, and a rod 108. An extension port 110 on the cylinder body 104 is coupled to a conduit 112 that is in fluid communication with a first output port 114 of the valve 90. A retract port 116 on the cylinder body 104 is coupled to a conduit 118 which in turn is coupled to an output port 120 of the valve 90. A drain line 122 coupled to the valve 90 provides a fluid path for the fluid to return to the sump 82. The electro-hydraulic controller 16 is also connected to a number of sensors 124, which detect the pressure in the respective conduits 112 and 118. While not critical to the understanding of the present disclosure, it should also be understood that the electro-hydraulic controller 16 operates a clutch control circuit 126 within the transmission 14.

When the chamber 66 is pressurized, a portion of the chamber 66 is defined by a surface of at least a portion of the input race 36. The area of the surface of the input race 36 that defines a portion of the chamber 66 has a load exerted that is proportional to the pressure in the chamber 66. Each cylinder 97 includes a piston face 130 on the extend side of the piston 106 and a piston face 132 on the retract side of the piston 106. The size of the piston face 130 is different from the size of the piston face 132 because of the space taken up by the rod 108. Because all of the cylinders have their extend side coupled to the same conduit 112 and a retract side coupled to the same conduit 118, the pressure in the conduit 112 is applied to each of the faces 130 and the pressure in the conduit 118 is applied to each of the faces 132. For this reason, the force applied to the rod 108 of each cylinder 97 is the same when the conduit 112 is pressurized. Similarly, the force applied to the rod 108 of each cylinder 97 is constant when conduit 118 is pressurized. In this context, the term "pressurized" means in fluid communication with the conduit 88. The opposite side of the cylinders from the side that is pressurized will be in fluid communication with the drain line 122 to return displaced fluid to the sump 82 during movement of the piston 106.

The electro-hydraulic controller 16 operates to control the pressure applied to the cylinders 97 and the input race 36 at a constant ratio depending on whether the cylinders 97 are being extended or retracted. This is accomplished by controlling a pressure compensator 128 in the circuit 84 so that the pressure in conduit 86 is at a first ratio compared to conduit 88 in extension and at a second ratio when in retraction. This variation compensates for the difference in the size of piston surfaces 130 and 132 respectively. In operation, the pressure in the chamber 66 is maintained at a first fixed ratio to the pressure in the conduit 88 during extension. The pressure in the chamber 66 is maintained at a second fixed ratio to the pressure in the conduit 88 during retraction. These pressure ratios maintain the rollers 62a, 62b, 62c, and 64a, 64b, 64c in equilibrium during normal operation and control the ratio of the clamping force to the force being applied to re-position the rollers when the variator 22 is in transition to change the ratio between the input races 34 and 36 and the output 38.

In equilibrium, the valve 90 will be moved to a neutral position so that the cylinders are held in a static position with the conduits 112 and 118 being closed by the valve. In the neutral position, the conduit 88 is in fluid communication with the drain line 122 and the pressure in conduit 86 is controlled based on the signal received from the sensors 124. When the electro-hydraulic controller 16 determines that the ratio between the shaft 32 and output 38 needs to change, the valve 90 is moved to one of two non-neutral positions depending on the direction the rollers 62a, 62b, 62c, and 64a, 64b, 64c need to be moved to achieve the desired ratio.

It will be appreciated by those of ordinary skill in the art that certain physical limitations are inherent to the structure described previously. The pressure compensator 128 is operable to vary the ratio of pressure between conduits 86 and 88. Physical limitations on the pressure compensator 128 along with the space limitations inherent in the construction of the transmission and the loads experienced by the cylinders and the input race 36 limit the capability of the variator 22 to operate in all pressure ranges necessary. A higher clamp force may be required to limit the slip between the rollers 62a, 62b, 62c, and 64a, 64b, 64c and the race surfaces 54, 56, 58, 60. Other benefits can be gained by limiting the pressure required by the system. By limiting the operating pressure required, the strength of the seals necessary to enclose the hydraulic components is reduced and the energy required to develop the pressure is reduced. As such, a reduction in operating pressures will reduce cost and improve efficiency as well as having a positive impact on reliability and durability of the variator 22.

Figure 4:
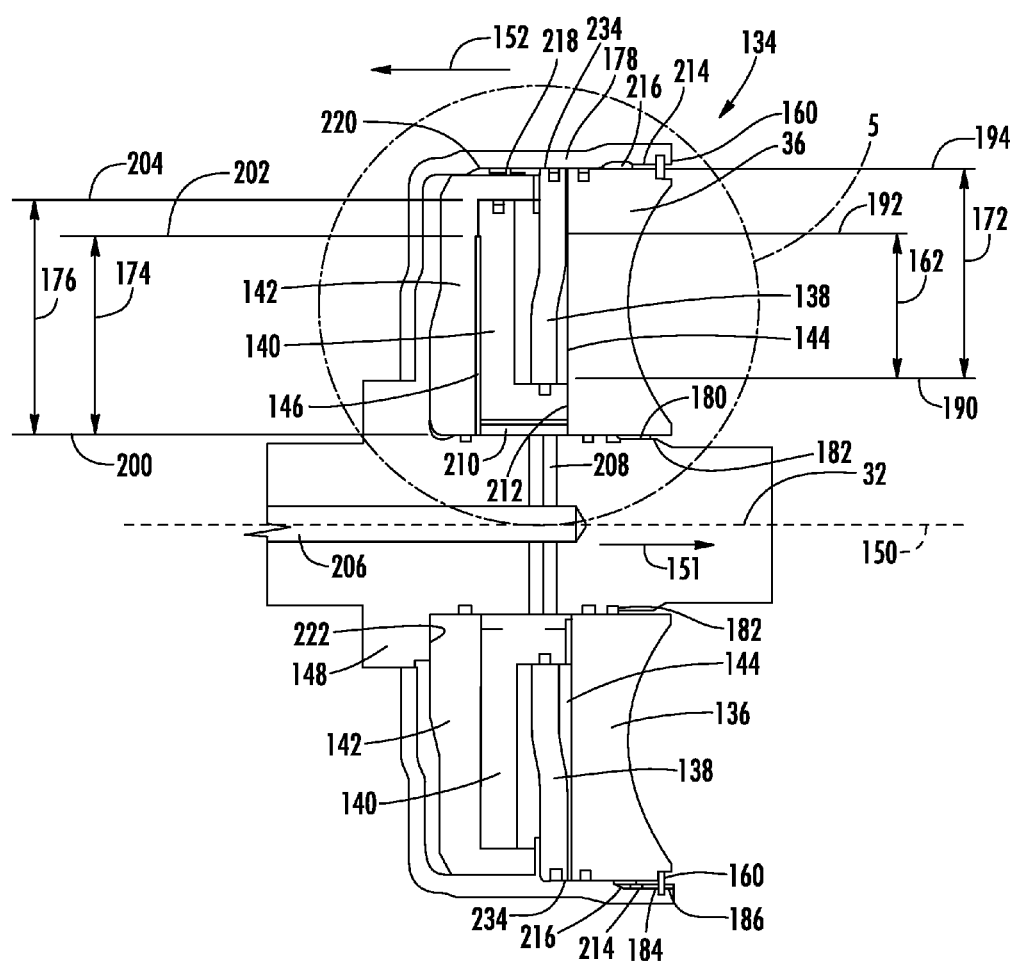
FIG. 4 is a cross-sectional view of a portion of the variator of the transmission of FIG. 1.

Referring now to FIGS. 4 and 5, the tandem endload assembly 134 includes nested components to increase the clamp load for the variator 22, for a given variator diameter. The tandem endload assembly 134 includes a frame 178 that houses the endload assembly 134 as will be described in further detail below. The tandem endload assembly 134 is supported on the shaft 32 and rotates with the shaft 32 about the shaft axis 150. The tandem endload assembly 134 includes the input race 36 that is positioned on the shaft 32 with splines 180 that engage splines 182 formed on the shaft 32. The input race 36 is an annular structure with the cross-section shown in FIG. 5. As described above, the splines 180 and 182 of the splined connection 78 provide for rotation of the shaft 32 to be transferred through the splines 182 to the splines 180 and thereby rotate the input race 36 around the axis 150. The input race 36 is free to move along the axis 150 some distance until a lip 184 formed on the input race 36 engages a retaining ring 160 that is positioned in a groove 186 formed in the frame 178.

The tandem endload assembly 134 further includes a load plate 138, a piston 140, and a backing plate 142. Each of load plate 138, piston 140, and backing plate 142 is an annular structure with the respective cross-sections shown in FIG. 5. The chamber 66 includes a second chamber 144 that is formed between the load plate 138 and the input race 36 and a first chamber 146 formed between the piston 140 and the backing plate 142. The second chamber 144 is pressurized with the fluid pressure acting on a surface 154 to develop a force that acts on the input race 36 to urge the input race 36 in the direction of an arrow 151 along the axis 150. The area on which the fluid acts on the surface 154 is defined by the area that corresponds with the length 162 shown in FIG. 4. The area is calculated by taking the distance from the line 192 to the axis 150 and calculating the area of a circle. A second area is calculated by taking the distance from the line 190 to the axis 150 and calculating the area of a second circle with that radius. The second area is subtracted from the first area to determine the area on which the pressurized fluid acts. Once sufficient pressure is applied, the input race 36 will move a sufficient distance to separate a surface 168 of the input race 36 from the surface 170 of the load plate 138 in the area 166 shown in FIG. 5. Once the input race 36 and load plate 138 are separated, the area on which the pressurized fluid acts increases to an outer diameter 194. Utilizing the formula of the area of circle where area (A)=$\pi r^2$, the reaction area of the input race 36 is increased by the square of the difference in distance between the line 194 and the line 192.

The upper end 193 of the load plate 138 is constrained from movement by the backing plate 142 that is formed to include a leg 195 that extends from a main body 196 of the backing plate 142 to engage the load plate 138. The piston 140 cooperates with the backing plate 142 to form the first chamber 146 for the pressurized fluid. A surface 156 of the piston is acted upon by the pressurized fluid to urge the piston in the direction 151 along the axis 150. The piston 140 is movable along the shaft 32 relative to the backing plate 142 when the fluid is pressurized. Under sufficient pressurization, a surface 198 of the piston 140 separates from the backing plate 142 in the area 191 shown in FIG. 5. Referring again now to FIG. 4, the initial area upon which the pressurized fluid acts on the piston is determined in a manner similar to the method described with regard to the input race 36. The area of the circle defined by the radius from the axis 150 to the line 200 is subtracted from the circle calculated using the radius from the axis 150 to the line 202. The area upon which will the fluid acts increases as the square of the distance from line 200 to radius line 204 when the piston surface 198 separates from the backing plate 142.

Pressurized fluid is transferred to the chambers 144 and 146 through a channel 206 formed along the axis 150 of the shaft 32. The channel 206 is in fluid communication with a port 208 which extends radially from the channel 206 in fluid communication with a channel 210 formed in the chamber 146. Fluid flows through a channel 212 from the port 208 to the chamber 144 between the input race 36 and the load plate 138.

The frame 178 is formed to include splines 214 that are engaged by splines 216 formed on the periphery of the input race 36. The splines 214 and 216 are engaged in a manner that allows the input race 36 to move relative to the shaft 32 as described above. The frame 178 also includes a plurality of splines 218 which are engaged with splines 220 formed in the periphery of the backing plate to limit movement of the backing plate 142 relative to the frame 178 about the shaft 32. The backing plate 142 is constrained from movement in the direction 152 by engagement of the backing plate 142 with a surface 222 formed on a flange 148 of the shaft 32. It should be noted that the frame 178 is formed such that the diameter of the frame 178 that engages the backing plate 142 and load plate 138 is smaller than the diameter of the frame 178 at the engagement of splines 214 and 216. Because of the difference in diameters and the limited length of the splines 218, the outer surface 234 of the load plate 138 provides a seal for first chamber 144. This simplifies indexing of the backing plate 142 to the frame 178 and reduces the manufacturing cost of the frame 178.

As seen in FIG. 5, the load plate 138 includes flanges 224 that engage with flanges 226 formed in the leg 195 of the backing plate 142 to prevent rotational movement of the load plate 138 relative to the backing plate 142. The piston 140 also includes a leg 228 that engages the input race 36 with splines 230 of the input race 36 engaging with splines 232 formed in the piston 140 to prevent rotation of the piston 140 relative to the input race 36.

The force acting on input race 36 includes both the forces developed by the pressure acting on surfaces 154 and 168 of the input race 36. Additional force is developed by the pressure in the chamber 146 that acts on the surface 156 of the piston and the surface 198 of the piston 140 if there is sufficient movement to permit engagement of the fluid with the surface 198. The force developed by the piston 140 is transferred through the leg 228 to the input race 36.

The load plate 138 has sufficient stiffness that there is little deflection of the load plate 138 under load and the backing plate 142 maintains the position of the load plate 138.

In normal operation, the electro-hydraulic controller 16 will receive information from other parts of the transmission 14 and the drive unit 12 regarding the vehicle load 18 (e.g., a driver input at the accelerator) to determine the proper ratio for the transmission 14. Operation of the transmission 14 by the electro-hydraulic control will include selecting an appropriate range of operation of the countershaft assembly 23 by employing the clutch control circuit 126. Once the range has been selected, the electro-hydraulic controller 16 will operate the hydraulic system shown in FIG. 3 as described above to adjust the ratio of the input shaft 32 to the output 38 to vary the speed of the vehicle 8 in response to the vehicle load 18 and the driver input.

Because of the nesting of the load plate 138 and the piston 140, the clamping force applied by the endload assembly 134 to the rollers 62a, 62b, 62c, 64a, 64b, 64c, the output 38, and the first input race 34 is larger than that which is achievable by a single acting endload assembly or a non-nested endload assembly within a given radial space claim. Thus, the operating pressures required to control the operation of the variator 22 are lower than those that would be required in a single acting or non-nested endload assembly for the same size variator. This allows a lower pressure variator to achieve a similar clamping force as compared to a higher pressure variator with a single chamber.

The variator 22 is embodied as a toroidal variator with rollers. In other embodiments, the variator 22 may be a friction-cone type variator or another suitable variable transmission configuration.

Although the invention has been described with reference to the preferred embodiments, variations and modifications exist within the scope and spirit of the invention as described and defined in the following claims.

The invention claimed is:

1. A continuously variable transmission comprising
a rotational input,
a shaft coupled to the rotational input, the shaft having an axis of rotation,
a variator including a nested endload assembly including two chambers configured to develop a clamping force on components of the variator, the nested endload assembly having:
a housing,
a backing plate axially engaged with the housing such that the backing plate is constrained from rotation relative to the housing, a piston positioned adjacent the backing plate and cooperating with the backing plate to define a first chamber for receiving pressurized fluid to act on the piston, and a load plate engaged with the backing plate, and an input race engaged with the piston to be acted upon by the piston when the piston is acted upon by pressurized fluid in the first chamber, the input race cooperating with the load plate to define a second chamber for receiving pressurized fluid to act on the input race, wherein (i) the housing has a first portion having a first diameter and formed to include at least one first spline and a second portion having a second diameter and formed to include at least one second spline, (ii) the diameter of the first portion is larger than the diameter of the second portion, and (iii) the backing plate includes a plurality of third splines engaged with the at least one second spline such that the backing plate is constrained from rotation relative to the housing.

2. The continuously variable transmission of claim 1, further comprising a countershaft assembly, the countershaft assembly coupled to the rotational input.

3. The continuously variable transmission of claim 2, further comprising at least one clutch operable to change a load path through the countershaft assembly.

4. The continuously variable transmission of claim 3, further comprising an electro-hydraulic control, the electro-hydraulic control operable to control the flow of pressurized fluid to the chambers.

5. The continuously variable transmission of claim 1, wherein the load of the piston does not act on the load plate and wherein the load plate is constrained from rotation relative to the housing.

6. The continuously variable transmission of claim 1, wherein the variator includes a first shaft and wherein a portion of the first chamber has a surface area that is spaced apart from the first shaft a first distance and the second chamber includes a surface area that is spaced apart from the first shaft by the first distance.

7. The continuously variable transmission of claim 6, wherein the load developed by the first chamber acts on the input race over a first area and wherein the load developed by the second chamber acts on the input race over a second area, the second area different from the first area.

8. The continuously variable transmission of claim 7, wherein the load plate is constrained from rotation relative to the housing.

9. The continuously variable transmission of claim 8, wherein the backing plate is constrained from movement relative to the first shaft in at least a first direction.

10. The continuously variable transmission of claim 9, wherein the backing plate is constrained from rotation relative to the housing.

11. The continuously variable transmission of claim 1, wherein the input race includes a plurality of fourth splines engaged with the at least one first spline such that the input race is constrained from rotation relative to the housing.

12. An endload assembly comprising
a housing,
a backing plate engaged with the housing,
a piston positioned adjacent the backing plate and cooperating with the backing plate to define a first chamber for receiving pressurized fluid to act on the piston,
a load plate engaged with the backing plate, and
an input race engaged with the piston to be acted upon by the piston when the piston is acted upon by pressurized fluid in the first chamber, the input race cooperating with the load plate to define a second chamber for receiving pressurized fluid to act on the input race,
wherein (i) the input race is engaged with the housing through a splined interface that constrains the input race from rotation relative to the housing and (ii) the piston is engaged with the input race through a splined interface that constrains the piston from rotation relative to the housing.

13. The endload assembly of any of claim 12, wherein the first chamber defines a piston reaction area on which the pressurized fluid acts.

14. The endload assembly of any of claim 13, wherein the piston reaction area is variable.

15. The endload assembly of any of claim 14, wherein the second chamber defines a variable input race reaction area on which the pressurized fluid acts.

16. The endload assembly of claim 12, wherein (i) the housing, backing plate, piston, load plate, and input race are all supported on a rotating shaft, (ii) the first and second chambers are in fluid communication with a pressurized channel formed in the shaft, and (iii) the backing plate is engaged with the housing through a splined interface that constrains the backing plate from rotation relative to the housing.

17. The endload assembly of claim 16, wherein the load plate is engaged with the backing plate through a splined interface that constrains the load plate from rotation relative to the backing plate.

18. An endload assembly comprising
a housing,
a backing plate engaged with the housing,
a piston positioned adjacent the backing plate and cooperating with the backing plate to define a first chamber for receiving pressurized fluid to act on the piston,
a load plate engaged with the backing plate, and
an input race engaged with the piston to be acted upon by the piston when the piston is acted upon by pressurized fluid in the first chamber, the input race cooperating with the load plate to define a second chamber for receiving pressurized fluid to act on the input race,
wherein (i) the housing, backing plate, piston, load plate, and input race are all supported on a rotating shaft, (ii) the first and second chambers are in fluid communication with a pressurized channel formed in the shaft, (iii) the backing plate is engaged with the housing through a splined interface that constrains the backing plate from rotation relative to the housing, and (iv) the load plate is engaged with the backing plate through a splined interface that constrains the load plate from rotation relative to the backing plate.

* * * * *